DETECTION OF ERRONEOUS DATA PROCESSING TRANSFERS
Filed Jan. 3, 1963
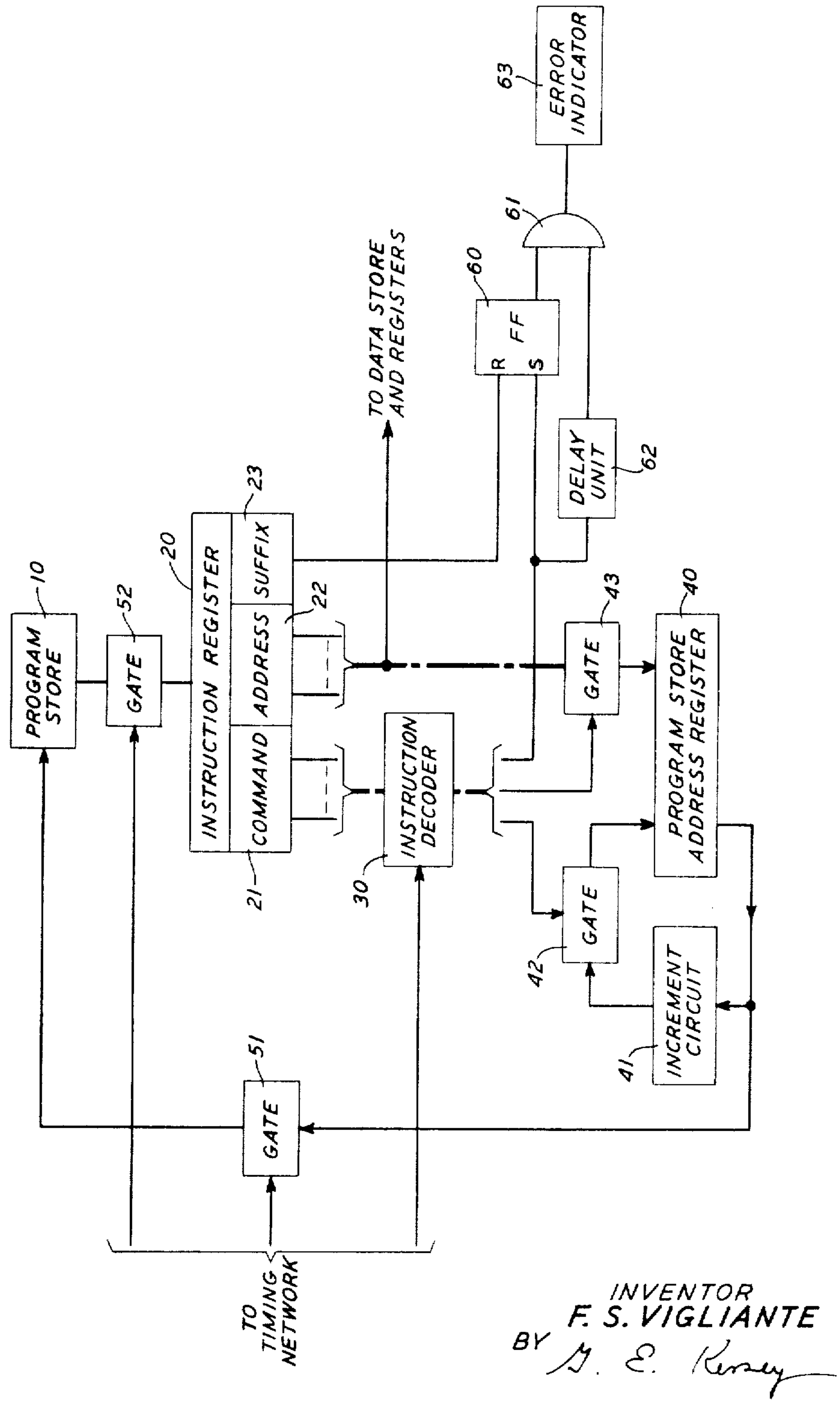
INVENTOR
F. S. VIGLIANTE
BY G. E. Kersey
ATTORNEY 3,283,307

DETECTION OF ERRONEOUS DATA PROCESSING TRANSFERS

Frank S. Vigliante, Piscataway Township, Middlesex County, N.J., assignor to Bell Telephone Laboratories, Incorporated, New York, N.Y., a corporation of New York Filed Jan. 3, 1963, Ser. No. 249,150
9 Claims. (Cl. 340—172.5)

This invention relates to the processing of data and, more particularly, to the detection of improper transfers dictated by a program during processing.

A program is a set of instructions for carrying out preassigned operations on data by the use of processing equipment. To make the data available as required, they are converted into a form that is compatible with the equipment and, during processing, are variously entered into, and extracted from, those portions of a memory constituting a data store. To make the instructions readily available, they are also converted into a form that is compatible with the processing equipment, and they are placed beforehand in those portions of the memory constituting a program store.

Associated with each instruction is an address giving its location in the program store. When taken together, an instruction and its address constitute a step of the program. Typically, the addresses are assigned sequentially to the steps of the program. This does not mean, however, that the executed instructions have sequential program store locations. Rather, the processing inevitably requires operations with varying degrees of recurrence. For example, the various steps of a program used to direct the operation of multiplying one number by another may be called upon frequently during processing. To save storage, the instructions associated with recurrent operations generally have a single subset, or subroutine, of entries in the program store. Whenever the program proceeds to a point where another subset is required, a transfer is made to it. This is accomplished by the inclusion, with each subset, a special instruction, called a transfer, which contains the location in the program store of the first instruction in a new subset.

Because of inevitable disturbances during processing, a transfer instruction may be misinterpreted. When this occurs, the ensuing execution of program steps will be seriously in error. The resulting error is of far greater consequence than when the data alone are subject to disturbances. In the latter case, the cumulative effect of an error can often be isolated and corrected without great difficulty. However, when a transfer instruction is in error, the ensuing sequence of executed instructions departs drastically from that dictated by the program with the result that it is difficult to isolate and determine the precise source of the error. Indeed, machine processing takes place at such a rapid rate that many thousands of steps of a program will often have been executed in error before a determination can be made that a transfer error has occurred.

Consequently, it is an object of the invention to isolate errors in a data processing system. Another object is to determine whether or not an error has been made in a data processing transfer instruction. A related object is to provide an indication of an error arising at the time of a transfer from one subset of program steps to another.

To accomplish the foregoing and related objects, the invention associates a tag signal with each group of signals corresponding to the first, or transferee, instruction of a subset to which a transfer is permitted during the course of processing. The tag signal serves to disengage an indicating unit that is enabled at the time of a transfer. Otherwise, for an improper transfer, there is no disengagement of the indicating unit which, after a pre-assigned delay interval, either terminates the processing or serves notice that a transfer error has taken place.

In one embodiment of the invention the tag signal corresponds to a single bit supplementing each transferee instruction and the indicating unit is a flip-flop. The latter is set at the time of a transfer and reset by the tag signal when a permitted transfer takes place.

Other aspects of the invention will become apparent after the consideration of an illustrative embodiment, taken in conjunction with the figure which is a partial block diagram of a data processing system.

As shown in the figure, a program store 10, operating through an instruction register 20 and an instruction decoder 30 serves as a source of instructions which are executed by data registers (not shown) acting in conjunction with a data store (not shown). For simplicity, the program store 10 is a separate unit from the data store, but the same unit, for example, a magnetic core matrix of well-known construction may be used for both. In addition, the various constituent gates, registers, and decoders of the figure are of standard design.

Before an instruction can be executed, it must be taken out of storage. This is done by a program address register 40 whose coded output gives the location of the instruction in the program store 10. After the code signals, forming the address, are gated in parallel through a program address gate 51 to the program store, the associated instruction passes through a preliminary register gate 52 into the instruction register 20. Both gates 51 and 52 are enabled from a timing network (not shown) of conventional construction. The instruction entering the register 20 conventionally has two portions—a coded command that enters a first section 21 of the register 20 and a coded address that enters a second section 22 of the register 20. The command is translated by the decoder 30, which is operated by the timing network; the address is dispatched to the data store and registers.

Under ordinary circumstances, where the steps of the program follow in sequence, each succeeding address at the output of the program address register 40 is obtained by augmenting its predecessor by unity through the operation of a standard increment circuit 41 and an increment circuit gate 42. However, when a transfer is to take place, the address indicated by the program address register 40 must be modified to accord with the location in the program store 10 of the first instruction to which a transfer is to be made. This modification is carried out through the use of a transfer instruction whose suffix portion does not refer to a location in the data store, but rather to a transfer location in the program store. When the transfer instruction enters the register 20, the decoder 30 operates a transfer gate 43, causing the transfer address in the register 20 to enter the program address register 40 where the pre-existing address is either replaced or modified. In that event, the next instruction entering the register 20 should be the first, i.e., transferee, instruction of a subset to which a transfer is being made.

To provide an indicaion of whether or not the transfer takes place properly, the invention accompanies each instruction, that begins a subsequence of instructions to which a transfer can be made, by a suffix code designation represented by signals that enter a suffix section 23 of the register 20. In addition, an indicator unit such as a flip-flop 60 is provided to indicate each execution of a transfer instruction.

After a transfer instruction enters the instruction register 20, the decoder 30 responds to the transfer command in the first section 21 of the register to set the flip-flop 60, indicating that the transfer has been executed and to simultaneously enable one input of an AND gate 61 through a delay unit 62. On the next cycle of operation, if correct, a transferee instruction enters the register 20, with the signal corresponding to the suffix code of the transferee instruction entering the suffix section 23 of the register. For example, if the suffix code is a single bit, i.e., a "1," the suffix section of the register is a single stage containing a signal level corresponding to the "1." In that event the flip-flop is reset and the enabling signal that ultimately arrives at the AND gate 61 through the delay unit 62 cannot activate an error indicator 63. However, if the flip-flop 60 is not reset the AND gate 61 is operated and the indicator 63 responds indicating that a transfer error has occurred and allowing appropriate corrective action to be taken.

Other embodiments of the invention will occur to those skilled in the art, along with numerous adaptations of it.

What is claimed is:

1. Apparatus comprising,
   a memory with a plurality of storage locations for a set of program instructions, some of which are instructions for transferring to other, transferee, instructions,
   means for indicating that a transfer instruction has been extracted from said memory,
   means for indicating that a transferee instruction has been extracted from said memory,
   and means for comparing the indications to verify that they have occurred in response to successive program instructions,
   thereby to verify the correctness of a transfer.

2. Apparatus for determining whether or not an error has been made in transferring from one subset of data processing instructions to another,
   which comprises
   a memory with a plurality of storage locations for signals corresponding to the various instructions, including transfer instructions, and additional storage location for tag signals associated with the initial instructions of subsets to which transfers are made,
   means for extracting said signals from said memory,
   indicating means,
   means responsive to extracted signals corresponding to a transfer instruction for enabling said indicating means,
   and means responsive to extracting tag signals for deactivating said indicating means,
   whereby a failure to deactivate said indicating means after a preassigned interval following its enablement indicates the presence of a transfer error.

3. Apparatus for indicating the occurrence of an error in transferring to a transferee instruction under the control of a transfer instruction,
   which comprises
   a memory for storing signals corresponding to data processing instructions,
   the signals representing a transferee instruction being accompanied by a tag signal serving to identify the transferee instruction as such,
   means responsive to said memory for indicating the extraction of signals corresponding to a transfer instruction therefrom,
   and means responsive to said tag signal for terminating the response of said indicating means,
   whereby the terminated response of said indicating means after a predetermined interval indicates that a permissible transfer has been made.

4. Apparatus comprising
   a memory for storing binary signals corresponding to various kinds of data processing instructions, the binary signals representing a valid transferee instruction being accompanied by a binary tag signal,
   a register for temporarily storing said signals,
   means for entering the stored signals from said memory into said register,
   means for decoding signals temporarily stored in said register,
   indicating means,
   means responsive to said decoding means for setting said indicating means when signals representating a transfer instruction are in said register,
   means for resetting said indicating means when said binary signals representing said transferee instruction are in said register,
   and output means for detecting whether or not said indicating means has been set and reset respectively by successive program instructions.

5. Data processing apparatus comprising
   a memory for storing binary instruction signals including binary tag signals associated with transferee instructions to which transfers are made during processing,
   a register connected to said memory for temporarily storing said instruction signals,
   said register having a plurality of stages, one of which is settable by said binary tag signals,
   means connected to said register for decoding the transfer instruction signals temporarily stored therein,
   a flip flop,
   means connected to said decoding means for setting said flip-flop by decoded transfer instruction signals,
   means connected to said one stage of said register for resetting said flip-flop by said binary tag signals,
   and output means for detecting whether or not said flip flop has been set and reset respectively by successive program instructions.

6. Apparatus comprising
   a program store with a plurality of storage locations for data processing instructions including transfer instructions each constituted of $n$ binary signals and transferee instructions each constituted of $n$ binary signals supplemented by a binary tag signal,
   a register connected to said program store and having $n$ stages, supplemented by a stage for said tag signal,
   a two-state device,
   means for decoding the signals occupying $n$ stages of said register and for setting said two-state device in the first one of its stages whenever said signals occupying said $n$ stages correspond to one of said transfer instructions
   means connected to the supplemental stage of said register for setting said two-state device in its second state whenever said tag signal is present, and
   means for detecting whether or not said two-state device is set in said first and second states in successive program steps.

7. Apparatus for monitoring transfers from one subset of data processing instructions to another,
   which comprises
   a memory for storing signals corresponding to the instructions of the various subsets, each subset including a transferee instruction to which a transfer is made under the control of a transfer instruction,
   means for extracting said signals from said memory,
   indicating means,
   means responsive to extracted signals corresponding to a transfer instruction for enabling said indicating means,
   and means responsive to extracted signals corresponding to a transferee instruction for disabling said indicating means,
   whereby deactivation of said indicating means within a preassigned delay interval following its activation indicates that a transfer has been made without error.

8. Apparatus for determining whether or not a transfer dictated by a data processing program is in error
   which comprises
   a memory with a plurality of storage locations for signals corresponding to various instructions of the data processing program, including, for each transfer from one subset of instructions to another, a transfer instruction which gives the location in the memory of a tagged transferee instruction representing the first instruction of a subset to which a transfer is being made, means for extracting said signals from said memory, means responsive to the extracted signals for indicating that a transfer instruction has been executed, means responsive to a signal corresponding to the tag condition of said transferee instruction for deactivating said indicating means, thereby to prevent said indicating means from indicating that an improper transfer has been made whenever said transferee instruction immediately follows said transfer instruction.

9. Apparatus for determining whether or not an error has been made in transferring from one subset of data processing instructions to another, which comprises means for storing groups of $n$ binary signals constituting data processing instructions, including transfer instructions, and for storing groups of $n+1$ binary signals constituting transferee instructions heading the various subsets to which transfers are made during the course of processing, a register having $n$ stages for receiving said groups of signals and an additional stage for receiving an $n+1$st signal associated with a transferee instruction, means for extracting said groups of signals from said storing means and for entering the extracted signals into said register, indicating device having alternative signal states, means responsive to each group of signals occupying the first $n$ stages of said register and constituting a transfer instruction for setting said device to one of said signal states, and means responsive to each signal of a transferee instruction occupying said additional stage of said register for resetting said device to its original signal state, whereby the delay interval between said setting and resetting determines whether or not a transfer error has been made.

References Cited by the Examiner

UNITED STATES PATENTS 3,213,427 7/1960 Schmitt ____________ 340—172.5

ROBERT C. BAILEY, *Primary Examiner.*

R. B. ZACHE, *Assistant Examiner.*